(12) United States Patent
Kinney et al.

(10) Patent No.: US 6,275,556 B1
(45) Date of Patent: Aug. 14, 2001

(54) METHOD AND APPARATUS FOR PREVENTING RELATIVE ROTATION OF TUBE MEMBERS IN A CONTROL ROD DRIVE MECHANISM

(75) Inventors: Calvin L. Kinney, Adams City; Richard Frank Guardiani, Sewickley; Martin E. Duga, Youngwood, all of PA (US)

(73) Assignee: Westinghouse Electric Company LLC, Pittsburgh, PA (US)

( * ) Notice: Subject to any disclaimer, the term of this patent is extended or adjusted under 35 U.S.C. 154(b) by 0 days.

(21) Appl. No.: 09/442,283

(22) Filed: Nov. 19, 1999

(51) Int. Cl.[7] .............................. B25G 3/12; F16G 11/02; G21C 7/14
(52) U.S. Cl. ......................... 376/232; 376/235; 403/278; 403/279; 403/281; 285/92
(58) Field of Search ..................................... 376/242, 227, 376/232, 235; 403/278, 279, 281; 285/92

(56) References Cited

U.S. PATENT DOCUMENTS

| | | | |
|---|---|---|---|
| 3,930,938 | * | 1/1976 | Berglund et al. .................... 176/36 |
| 3,941,653 | * | 3/1976 | Thorp, II ............................. 176/36 R |
| 3,953,287 | | 4/1976 | Long et al. . |
| 3,992,255 | | 11/1976 | DeWesse . |
| 4,426,761 | * | 1/1984 | Sassak ................................. 29/447 |
| 4,492,668 | | 1/1985 | Pilgrim, Jr. et al. . |
| 4,778,645 | | 10/1988 | Altman et al. . |
| 4,940,260 | * | 7/1990 | Odriozola ............................ 285/3 |
| 5,009,834 | | 4/1991 | Tessaro . |
| 5,263,060 | | 11/1993 | Obermeyer . |
| 5,307,384 | | 4/1994 | King et al. . |
| 5,363,421 | | 11/1994 | Obermeyer . |
| 6,050,609 | * | 4/2000 | Boscaljon et al. .................. 285/81 |

FOREIGN PATENT DOCUMENTS

2248398 * 4/1973 (DE) .

* cited by examiner

Primary Examiner—Charles T. Jordan
Assistant Examiner—Kyongtaek K. Mun

(57) ABSTRACT

A control rod drive mechanism includes a first tubular member having a first threaded portion and a first generally cylindrical outer surface, the first tubular member including a first plurality of slots spaced circumferentially on the first outer surface and extending in a direction parallel to the axis of the first tubular member, and a second tubular member having a second threaded portion and a second generally cylindrical outer surface, the second tubular member including a second plurality of slots spaced circumferentially on the second outer surface and extending in a direction parallel to the axis of the second tubular member. The first and second tubular members are axial aligned with the first and second threaded portions being engaged with each other to form a threaded joint therebetween. A locking sleeve overlaps at least a portion of the first outer surface of the first tubular member and at least a portion of the second outer surface of the second tubular member. The sleeve includes a generally cylindrical interior wall with deformed portions of the wall extending into said first and second plurality of slots. The deformed portions of the wall conform to an internal surface of each of the slots to evenly distribute circumferential loads on the locking sleeve. The invention also encompasses the method of assembling the control rod drive mechanism.

3 Claims, 4 Drawing Sheets

METHOD AND APPARATUS FOR PREVENTING RELATIVE ROTATION OF TUBE MEMBERS IN A CONTROL ROD DRIVE MECHANISM

BACKGROUND OF THE INVENTION

This invention pertains to control rod drive mechanisms for a nuclear reactor and more particularly to an apparatus and method for preventing relative rotation of coaxial tubes forming a part of a control rod drive mechanism.

In a commercial nuclear reactor, heat, from which electricity is generated, is produced by fissioning of a fissile material such as enriched uranium. This fissile material, or nuclear fuel, is typically contained within a core made up of a plurality of fuel elements, coextensively arranged in a spaced parallel array. Movable control rods are dispersed throughout the core to control the fission process. The control rods generally comprise a plurality of elongated rods containing neutron absorbing materials, for example silver, indium and cadmium, which fit in openings among the fuel elements so as to be guided thereby during movement into and out of the core. Inserting a control rod into the core adds more absorber material and hence, decreases the nuclear reaction; conversely, withdrawing a control rod removes absorber material and hence, increases the nuclear reaction and thereby, the power output. The nuclear core and the control rods are positioned within and supported by a reactor vessel through which a reactor coolant flows.

Movement of the control rod into or out of the nuclear core is accomplished by control rod drive mechanisms that are mounted onto the top cover of the reactor vessel. One of the more commonly used types of control rod drive mechanisms is referred to as the "magnetic jack" type of mechanism. With this type of mechanism, the control rods are jacked into or out from the nuclear core in a series of motions each involving moving the control rod a discrete incremental distance. The jacking movement is accomplished by two sets of axially spaced magnet coils in conjunction with magnet plungers having gripper arms attached thereto by alternately and sequentially gripping, moving and releasing the control rod. One example of this type of control rod drive mechanism is shown and described in U.S. Pat. No. 5,009,834, entitled "Curvilinear Translating Latch And Linkage Arrangement In A Control Rod Drive Mechanism Of A Nuclear Reactor".

Each of the previously mentioned movable control rods is engaged by a control rod drive shaft capable of moving the control rod slidably through an associated fuel rod grid. Each control rod drive shaft extends through an upper core plate and through an upper support plate that is spaced above the upper core plate, the upper support plate and the upper core plate being horizontally disposed in the reactor pressure vessel. The control rods that are engaged by the control rod drive shaft are slidably received in elongated thimble tubes disposed through the grid cells of each fuel assembly, which fuel assembly is in turn located below the upper core plate.

The control rod drive mechanisms are segmented for ease of assembly when positioning it within the reactor pressure vessel. However, during normal operation of the reactor, the liquid moderator coolant circulating in the reactor pressure vessel causes vibration of the internal components, including the control rod drive mechanisms, which are disposed in the vessel. Moreover, off-normal operation caused by seismic events and postulated accidents (e.g., loss-of-coolant accident) can also cause vibration of the internal components. It is desirable to prevent any possibility of unthreading of the threaded ends of the control rod drive mechanisms during normal and off-normal conditions because such unthreading, that may be caused by these vibrations, may lead to the elongated portions of the control rod drive mechanisms becoming disconnected at their threaded ends.

One well-known control rod drive mechanism uses threaded joints to connect cylindrical pieces. The stationary gripper plunger and the plunger half are two such cylindrical pieces that are threaded together. An anti-rotation screw radially penetrates both pieces to prevent the pieces from rotating relative to each other and becoming disengaged. Dynamic axial loads between the stationary gripper plunger and the plunger half were intended to be taken by the joint threads and not by the anti-rotation screw. However, part tolerances can combine to allow the dynamic axial loads to be taken by the anti-rotation screw. This can lead to failure of the anti-rotation screw.

Therefore, a problem in the art has been to provide means for preventing unthreading of the threaded ends of the control rod drive mechanism tubes when the control rod drive mechanism tubes are subjected to vibrations caused by normal operating conditions and when the control rod drive mechanism tubes are subjected to vibrations caused by off-normal operating conditions.

In addition to control rod drive mechanisms, reactor vessels also contain instrumentation tubes. U.S. Pat. No. 5,263,060 discloses a segmented instrumentation tube including a locking sleeve for interlocking the segments of the tube. That patent discloses an instrumentation tube having a first member having a threaded end portion that has a plurality of first holes spaced circumferentially around the outside surface thereof. The instrumentation tube also has a second member having an internally threaded end portion that has a plurality of second holes spaced circumferentially around the outside surface thereof. The internal threads of the second member are caused to threadably engage the external threads of the first member to produce a threaded joint therebetween. A sleeve having an inside surface surrounds the end portion of the first member and the end portion of the second member and thus surrounds the threaded joint. The sleeve includes a plurality of first projections and second projections that extend from the inside surface of the sleeve to engage the first holes and the second holes, respectively. The outside surface of the sleeve is then crimped or swaged at the locations of the first projections and second projections such that the first projections and the second projections engage their respective holes. In this manner, independent rotation of the first member with respect to the second member is prevented, so that the instrumentation tube will not unthread at its threaded joint when subjected to vibration.

By using a sleeve that has internal projections, the holes into which those projections extend, must be aligned with the projections. This establishes a predetermined fixed distance between the tubes and does not allow for axial adjustment of the tubes. In addition, the use of internal projections on the sleeve requires the sleeve to have a diameter large enough to permit the internal projections to slide over the outer surface of the tubes during initial assembly. Furthermore, tolerances in the dimensions of the projections can result in the circumferential load being carried by less that all of the projections.

There is a need for a device for locking a pair of threaded tubular members that provides for axial adjustment of the tubular members, does not require that the members assume a predetermined angular orientation with respect to each other, and distributes the circumferential load more evenly among the parts of a locking sleeve.

This invention provides a method and apparatus for preventing relative rotation of coaxial tube members of a control rod drive mechanism, suitable for use in a nuclear power reactor pressure vessel. The method and apparatus utilize a locking sleeve for interlocking the tube members, so that the threaded ends of the tube members do not unthread when subjected to vibration caused by normal and off-normal operation of the nuclear reactor.

A control rod drive mechanism constructed in accordance with this invention includes a first tubular member having a first threaded portion and a first generally cylindrical outer surface, the first tubular member including a first plurality of slots spaced circumferentially on the first outer surface and extending in a direction parallel to the axis of the first tubular member, and a second tubular member having a second threaded portion and a second generally cylindrical outer surface, the second tubular member including a second plurality of slots spaced circumferentially on the second outer surface and extending in a direction parallel to the axis of the second tubular member. The first and second tubular members are axially aligned, and the first and second threaded portions are engaged with each other to form a threaded joint therebetween. A sleeve overlaps at least a portion of the first outer surface of the first tubular member and at least a portion of the second outer surface of the second tubular member. The sleeve includes a generally cylindrical interior wall with deformed portions of the wall extending into said first and second plurality of slots.

The invention also encompasses a method of assembling a control rod drive mechanism comprising a first tubular member having a first threaded portion and a first generally cylindrical outer surface, and a second tubular member having a second threaded portion and a second generally cylindrical outer surface, wherein the method comprises the steps of: producing a first plurality of slots spaced circumferentially on the first outer surface of the first tubular member, with the first plurality of slots extending in a direction parallel to the axis of the first tubular member; producing a second plurality of slots spaced circumferentially on the second outer surface of the second tubular member, with the second plurality of slots extending in a direction parallel to the axis of the second tubular member; engaging the threaded portions of the first and second tubular members to form a threaded joint; positioning a sleeve overlapping at least a portion of the first outer surface of the first tubular member and at least a portion of the second outer surface of the second tubular member; and deforming a generally cylindrical interior wall of the sleeve such that deformed portions of the wall extend into the first and second plurality of slots.

The locking sleeve prevents independent rotation of the segments, so that the threaded ends of the segments remain threadably engaged even when subjected to vibration. The deformed portions of the interior wall of the locking sleeve can be made to conform to the internal surfaces of the slots, thereby ensuring that the circumferential load on the sleeve is evenly distributed among the deformed portions of the sleeve.

BRIEF DESCRIPTION OF THE DRAWINGS

The invention will be better understood from the following description, taken in conjunction with the accompanying drawings wherein.

DESCRIPTION OF THE PREFERRED EMBODIMENTS

Figure 1:
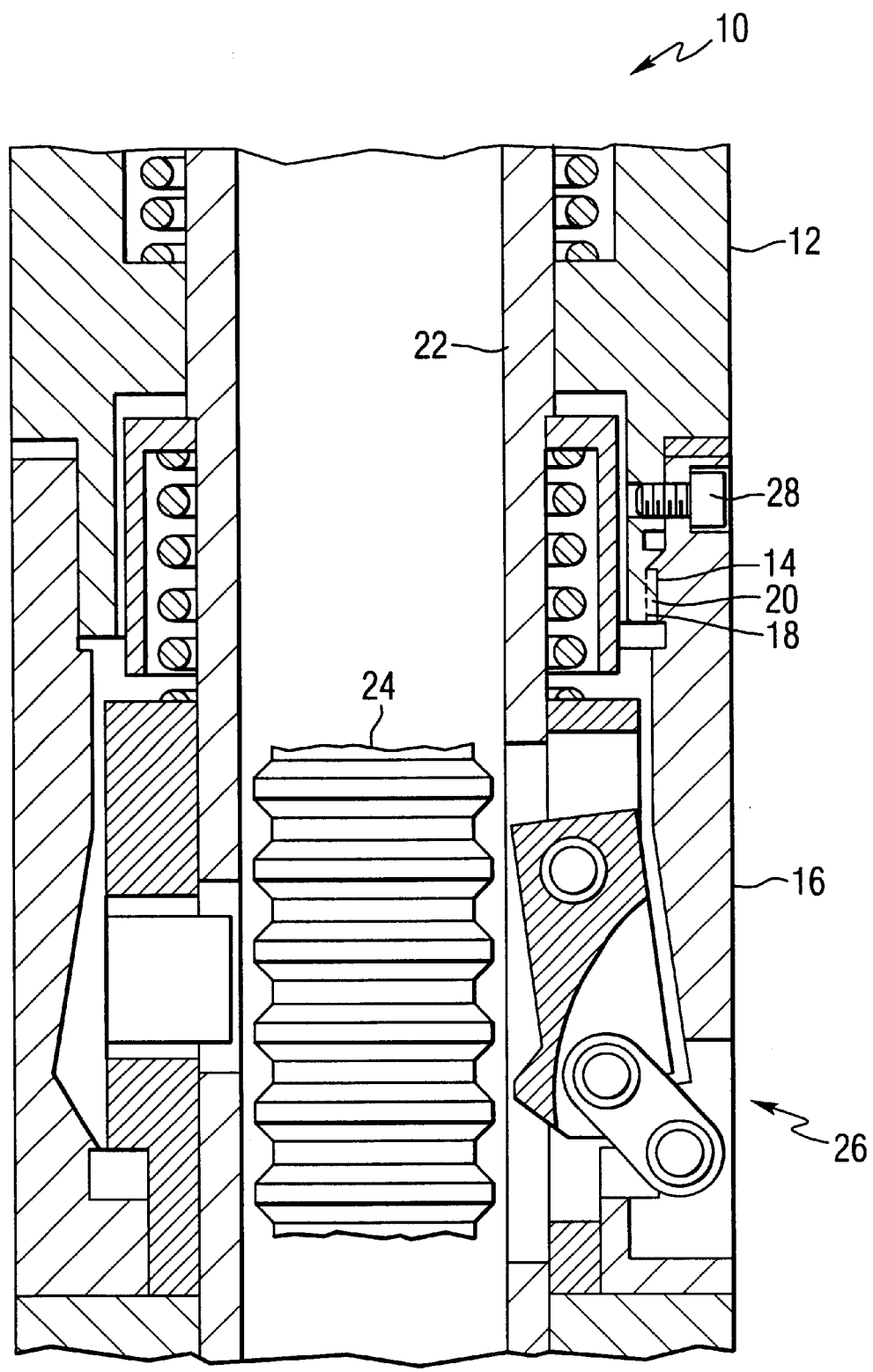
FIG. 1 shows in partial vertical section, a prior art control rod drive mechanism.

Referring to the drawings, FIG. 1 shows in partial vertical section, a prior art control rod drive mechanism (CRDM) 10. The CRDM includes a first generally cylindrical tubular member 12 having a threaded portion 14 and a second generally cylindrical tubular member 16 having a threaded portion 18. The threaded portions 14 and 18 are engaged to for a threaded joint 20. The first and second tubular members encase a third tubular member 22 that provides a shaft for vertical movement of a control rod 24. The second tubular member further supports a latch and linkage arrangement, generally designated as 26. In operation, the latch and linkage arrangement is manipulated to move the control rod in a vertical direction. The control rod drive mechanism is subjected to vibration that may cause relative rotation between the tubular members. To prevent such relative rotation, a setscrew 28 connects the first and second tubular members.

Figure 2:
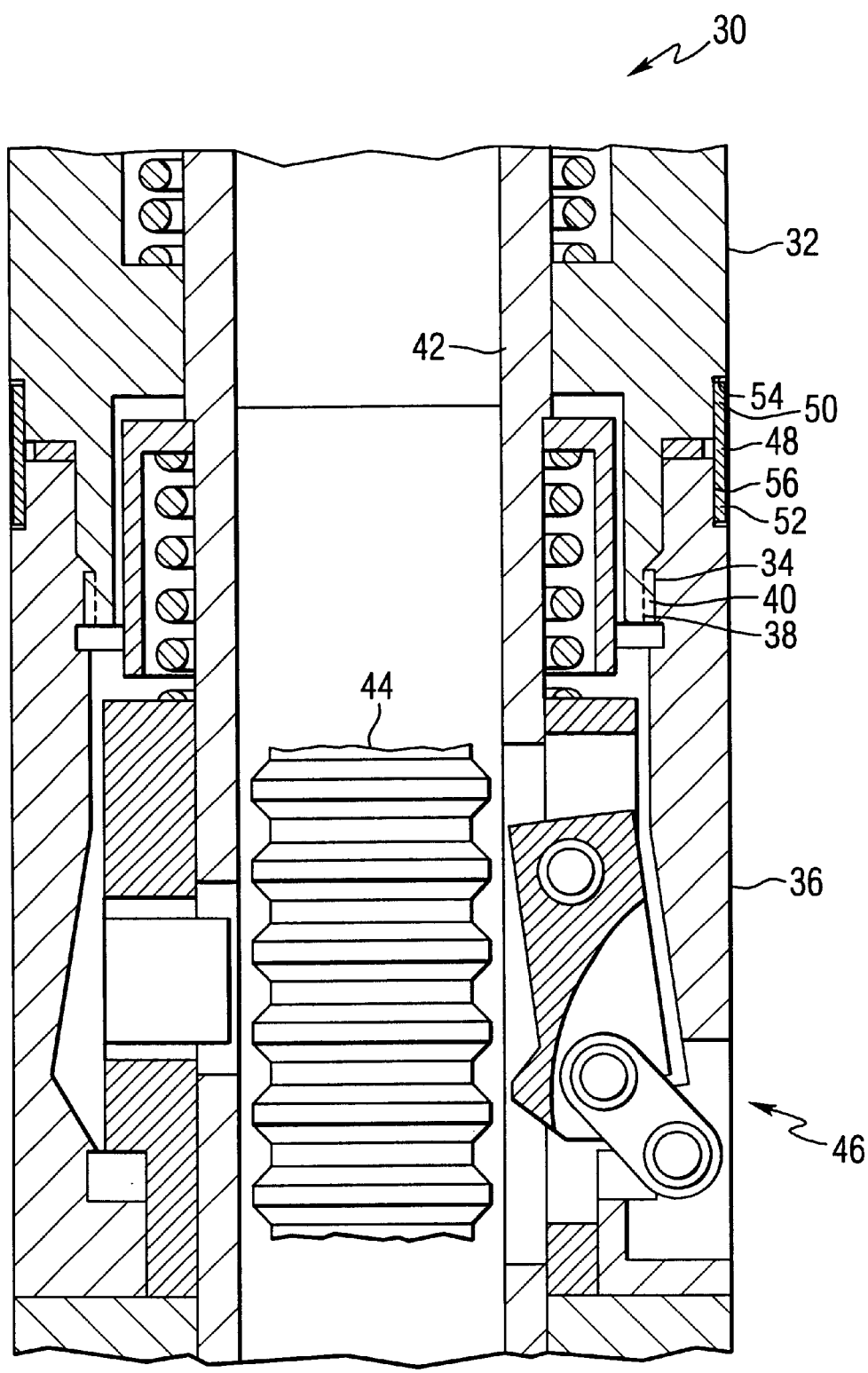
FIG. 2 shows in partial vertical section, a control rod drive mechanism having a locking ring for preventing relative rotation of tubular members thereof, in accordance with the present invention.

FIG. 2 shows in partial vertical section, a control rod drive mechanism (CRDM) 30 having an apparatus for preventing relative rotation of tubular members thereof, in accordance with the present invention. The CRDM 30 includes a first generally cylindrical tubular member 32 having a threaded portion 34 and a second generally cylindrical tubular member 36 having a threaded portion 38. The threaded portions 34 and 38 are engaged to for a threaded joint 40. The first and second tubular members encase a third tubular member 42 that provides a shaft for vertical movement of a control rod 44. The second tubular member further supports a latch and linkage arrangement, generally designated as 46. In operation, the latch and linkage arrangement is manipulated to move the control rod in a vertical direction. The control rod drive mechanism is subjected to vibration that may cause relative rotation between the tubular members. To prevent such relative rotation, a locking sleeve 48 is positioned around at least a portion 50, 52 of the outer surface of the first and second tubular members, respectively. The outer generally cylindrical surfaces of the first and second tubular members, each define a plurality of slots 54, 56, only two of which are shown in FIG. 2. The slots extend in a direction that is parallel to the axis of the tubular members. The locking sleeve includes a smooth generally cylindrical interior wall that is swaged or otherwise deformed such that deformed portions of the interior wall extend into the slots in the tubular members. In the preferred embodiment, the deformed portions of the interior wall conform to the internal surfaces of the slots so that circumferential loads are shared evenly among the deformed portions of the locking sleeve. Uniform application of crimping to the deformed portions of the locking sleeve results in 100% contact between the crimped material of the deformed portion of the locking sleeve and the slot into which it is swaged. This provides maximum anti-rotation or retention load capacity.

Figure 3:
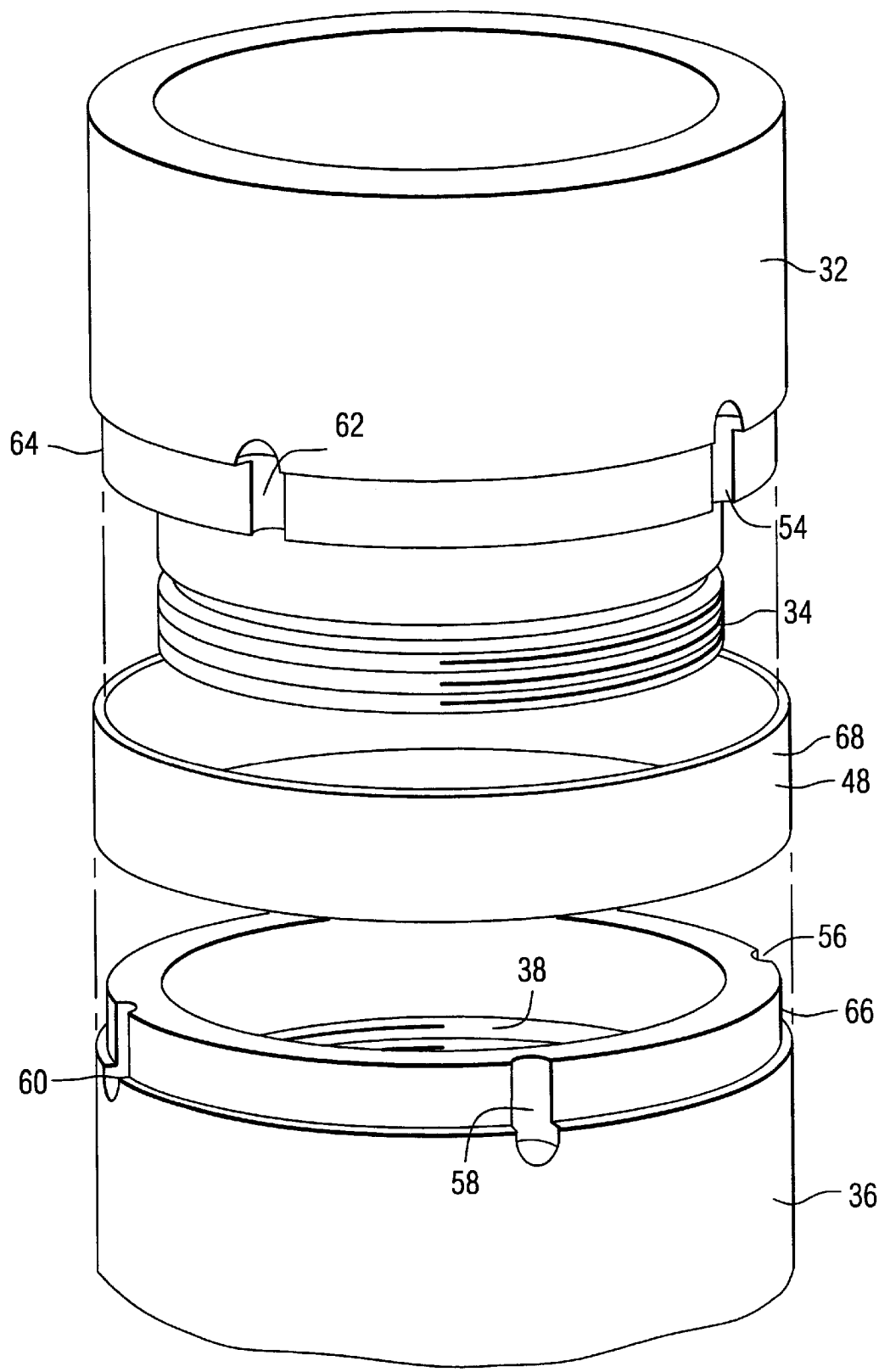
FIG. 3 is an exploded isometric view of the tubular members and locking ring of the control rod drive mechanism of FIG. 2.

FIG. 3 is an exploded isometric view of the tubular members and locking ring of the control rod drive mechanism of FIG. 2. This FIG. shows additional slots 58, 60, and 62 that are positioned around the circumference of the ends of the tubular members 32 and 36. In this embodiment, a first recess 64 has been cut into tubular member 32, and a second recess 66 has been cut into tubular member 36. When the tubular members are joined, these recesses receive the locking sleeve such that the outer surface 68 of the locking sleeve does not extend beyond the outer surfaces of the tubular members. This FIG. also shows that the interior surface of the locking sleeve is a smooth cylinder prior to assembly of the tubular members and deformation of the locking sleeve interior surface. After deformation of the locking sleeve, that deformed portion of the locking sleeve can uniformly and fully engage the slots, thus maximizing the load carrying capacity of the sleeve.

Figure 4:
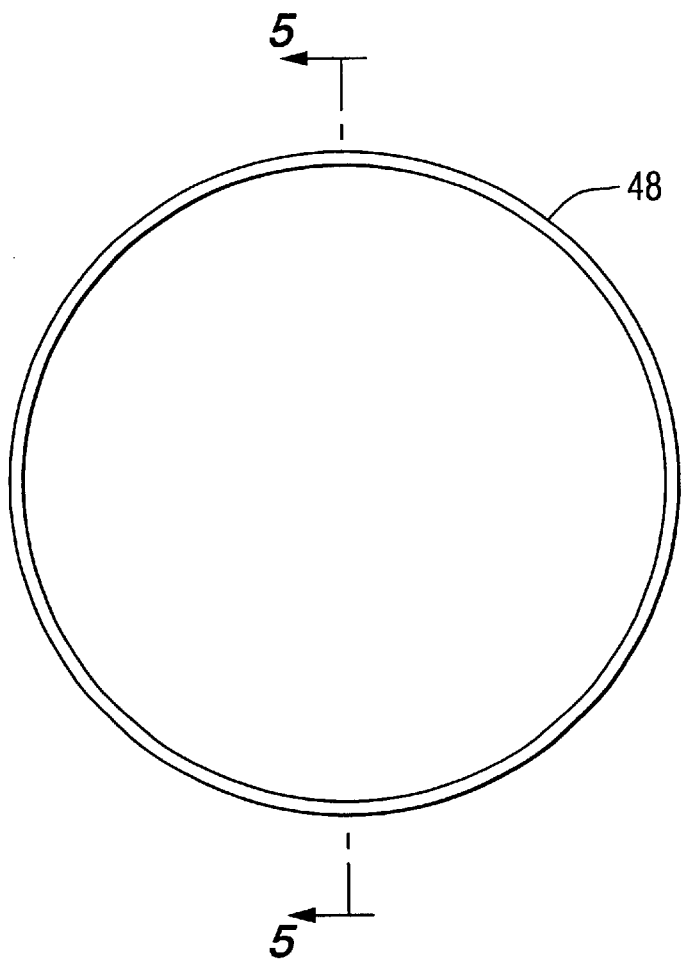
FIG. 4 is an end view of the locking ring of FIG. 3.
Figure 5:
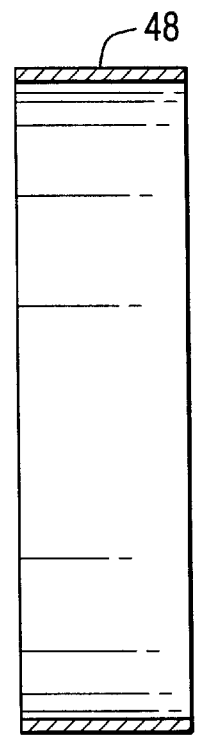
FIG. 5 is a side elevation view of the locking ring of FIG. 3.
Figure 6:
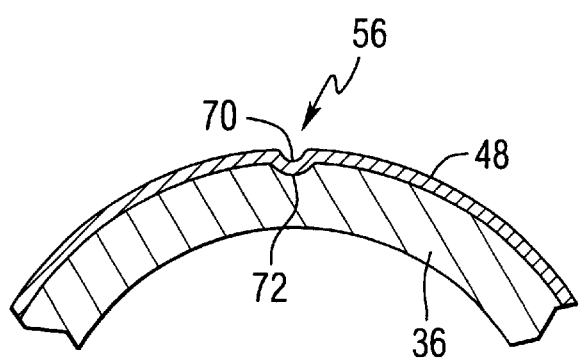
FIG. 6 is a sectional view of a joint in the control rod drive mechanism of FIG. 2, showing the wall of the locking ring deformed to conform to the internal surfaces of slots in one of the tube members of the control rod drive mechanism of FIG. 2.

FIGS. 4 and 5 are end and side elevation views of the locking ring 48 of FIG. 3. FIG. 6 is an enlarged sectional view of a portion of the control rod drive mechanism of FIG. 2. In FIG. 6, a deformed portion 70 of the locking ring 48 is shown to extend into slot 56. The deformed portion of the locking ring is shown to conform to the internal surface 72 of slot 56. By swaging the locking ring so that the deformed portions conform to the internal surfaces of the slots, the circumferential load experienced by the locking ring will be substantially evenly distributed among the deformed portions of the locking ring.

The invention also encompasses the method of assembling the control rod drive mechanism. The method comprises the steps of producing a first plurality of slots spaced circumferentially on a first outer surface of the first tubular member, with the first plurality of slots each extending in a direction parallel to the axis of the first tubular member; producing a second plurality of slots spaced circumferentially on a second outer surface of the second tubular member, with the second plurality of slots each extending in a direction parallel to the axis of the second tubular member; engaging threaded portions of the first and second tubular members to form a threaded joint; positioning a sleeve overlapping at least a portion of the first outer surface of the first tubular member and at least a portion of the second outer surface of the second tubular member; and deforming a generally cylindrical interior wall of the sleeve, wherein deformed portions of the wall extend into the first and second plurality of slots.

This invention eliminates the socket head cap screw used in prior designs as an anti-rotation device, replacing it with a lock sleeve. In the prior art design, an anti-rotation lock screw was used to prevent the stationary gripper plunger and plunger half from unthreading. A locking cup was used to lock the anti-rotation screw and prevent it from backing out of the threaded hole in the stationary gripper plunger. The present invention employs a one-piece lock sleeve to prevent rotation of the stationary plunger relative to the plunger half. A reduced diameter recess is machined into both the stationary gripper plunger and the plunger half to allow installation of the lock sleeve. In the preferred embodiment, a plurality of slots are machined into the recessed diameter of the stationary gripper plunger half. The lock sleeve is deformed, or crimped, into the plurality of slots. The lock sleeve is positively captured and prevents rotation of the stationary gripper plunger relative to the plunger half.

Using the structure of this invention, the two tubular members can be screwed together without regard to their final angular orientation with respect to each other, since the locking ring is not deformed until the tubular members are in their desired relationship. There is no predetermined setting for the axial spacing of the tubular members other than that determined by the axial length of the locking sleeve. By using a locking sleeve that initially has a smooth internal cylindrical surface, the internal diameter of the locking sleeve can be close to the external diameter of the tubular members, or the recessed portions thereof, if used. This provides a more secure assembly that can be achieved using a sleeve having preexisting internal projections.

This invention provides an improved control rod drive mechanism including a locking sleeve for interlocking the tubular members of the control rod drive mechanism, so that the threaded portions of the control rod drive mechanism will not unthread when subjected to vibration that may be caused by normal and off-normal operation of the nuclear reactor.

What is claimed is:

1. A control rod drive mechanism comprising:
   a first tubular member having a first threaded portion and a first generally cylindrical outer surface, said first tubular member including a first plurality of slots spaced circumferentially on the first outer surface and extending in a direction parallel to the axis of the first tubular member;
   a second tubular member having a second threaded portion and a second generally cylindrical outer surface, said second tubular member including a second plurality of slots spaced circumferentially on the second outer surface and extending in a direction parallel to the axis of the second tubular member;
   said first and second threaded portions being engaged with each other to form a threaded joint therebetween; and
   a sleeve overlapping at least a portion of the first outer surface and at least a portion of the second outer surface, said sleeve having a generally cylindrical interior wall with deformed portions of said wall extending into said first and second plurality of slots.

2. The control rod drive mechanism of claim 1, wherein:
   said deformed portions of said wall conform to an internal surface of each of said slots.

3. The control rod drive mechanism of claim 1, further comprising:
   a first recess adjacent a first end of said first generally cylindrical outer surface of said first tubular member; and
   a second recess adjacent a first end of said second generally cylindrical outer surface of said second tubular member, wherein said locking sleeve is positioned in said first and second recesses.

* * * * *